United States Patent
Moy et al.

(10) Patent No.: US 7,212,813 B2
(45) Date of Patent: May 1, 2007

(54) TELECOMMUNICATION DEVICE WITH SOFTWARE COMPONENTS

(75) Inventors: Christophe Moy, La Chapelle Des Fougeretz (FR); Apostolos Kontouris, Rennes (FR); Alexis Bisiaux, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 149 days.

(21) Appl. No.: 10/913,368

(22) Filed: Aug. 9, 2004

(65) Prior Publication Data
US 2005/0066156 A1    Mar. 24, 2005

(30) Foreign Application Priority Data
Aug. 8, 2003   (EP)   .................... 03291999

(51) Int. Cl.
H04M 3/00   (2006.01)
(52) U.S. Cl. .................. 455/418; 455/419; 455/312; 716/16; 709/220; 709/221; 719/310; 719/312; 711/101
(58) Field of Classification Search ........ 455/418–419, 455/550, 3.01; 719/310, 312; 716/2, 7, 716/9, 16; 709/220, 221, 250; 711/101; 703/23–27
See application file for complete search history.

(56) References Cited

U.S. PATENT DOCUMENTS

| 6,871,341 | B1* | 3/2005 | Shyr ........................ 717/131 |
| 6,976,065 | B2* | 12/2005 | Kaiser et al. ............... 709/221 |
| 2003/0050055 | A1* | 3/2003 | Ting et al. .................. 455/419 |
| 2003/0099358 | A1* | 5/2003 | Michael et al. ............. 380/270 |
| 2003/0210789 | A1* | 11/2003 | Farnham et al. ........... 380/270 |
| 2004/0025004 | A1* | 2/2004 | Gorday et al. .............. 713/100 |

(Continued)

FOREIGN PATENT DOCUMENTS

WO   WO 01/90890   11/2001

(Continued)

OTHER PUBLICATIONS

M. Mehta, et al., IEEE Communications Megazine, vol. 39, No. 8, XP-002223682, pp. 82-89, "Reconfigurable Terminals: An Overview of Architectural Solutions", Aug. 2001.

(Continued)

*Primary Examiner*—Jean Gelin
*Assistant Examiner*—Khawar Iqbal
(74) *Attorney, Agent, or Firm*—Oblon, Spivak, McClelland, Maier & Neustadt, P.C.

(57) ABSTRACT

The present invention provides a telecommunication system that has a processing unit; a memory; and at least a software component implemented on a processing unit and using said memory. Each software component includes a set of attributes, each attribute being a pointer to a particular location of a memory in which configuration data are stored, the configuration data defining features of the software component, at least a run attribute defining a run-time process for processing the data in the software component; and a reconfigure method adapted to switch the linkage of an attribute from an initial location in said memory to a final location in said memory. Furthermore, the system is configured to trigger on request the reconfigure method for software component and activate the run-time process defined by the run attribute of the or each software component according to a predetermined schedule.

11 Claims, 3 Drawing Sheets

U.S. PATENT DOCUMENTS

| | | | |
|---|---|---|---|
| 2004/0029575 A1* | 2/2004 | Mehta | 455/419 |
| 2004/0049561 A1* | 3/2004 | Tafazolli et al. | 709/220 |
| 2005/0059427 A1* | 3/2005 | Wallace | 455/552.1 |
| 2006/0015674 A1* | 1/2006 | Murotake | 711/101 |

FOREIGN PATENT DOCUMENTS

| | |
|---|---|
| WO | WO 01/90890 A1 * 11/2001 |

OTHER PUBLICATIONS

M. Mehta, Presented At Its Mobile Communications Summit 2000, 'Online!, XP-002285763, pp. 1-19, "Trust Approach to Software Defined Radio-Baseband Considerations", Oct. 1, 2000.

D. Gupta, et al., Fault-Tolerant Computing, Digest of Papers., The Twenty-Third International Symposium On Toulouse, XP-010251319, pp. 30-35, "Increasing System Availability Through On-Line Software Version Change", Jun. 22, 1993.

* cited by examiner

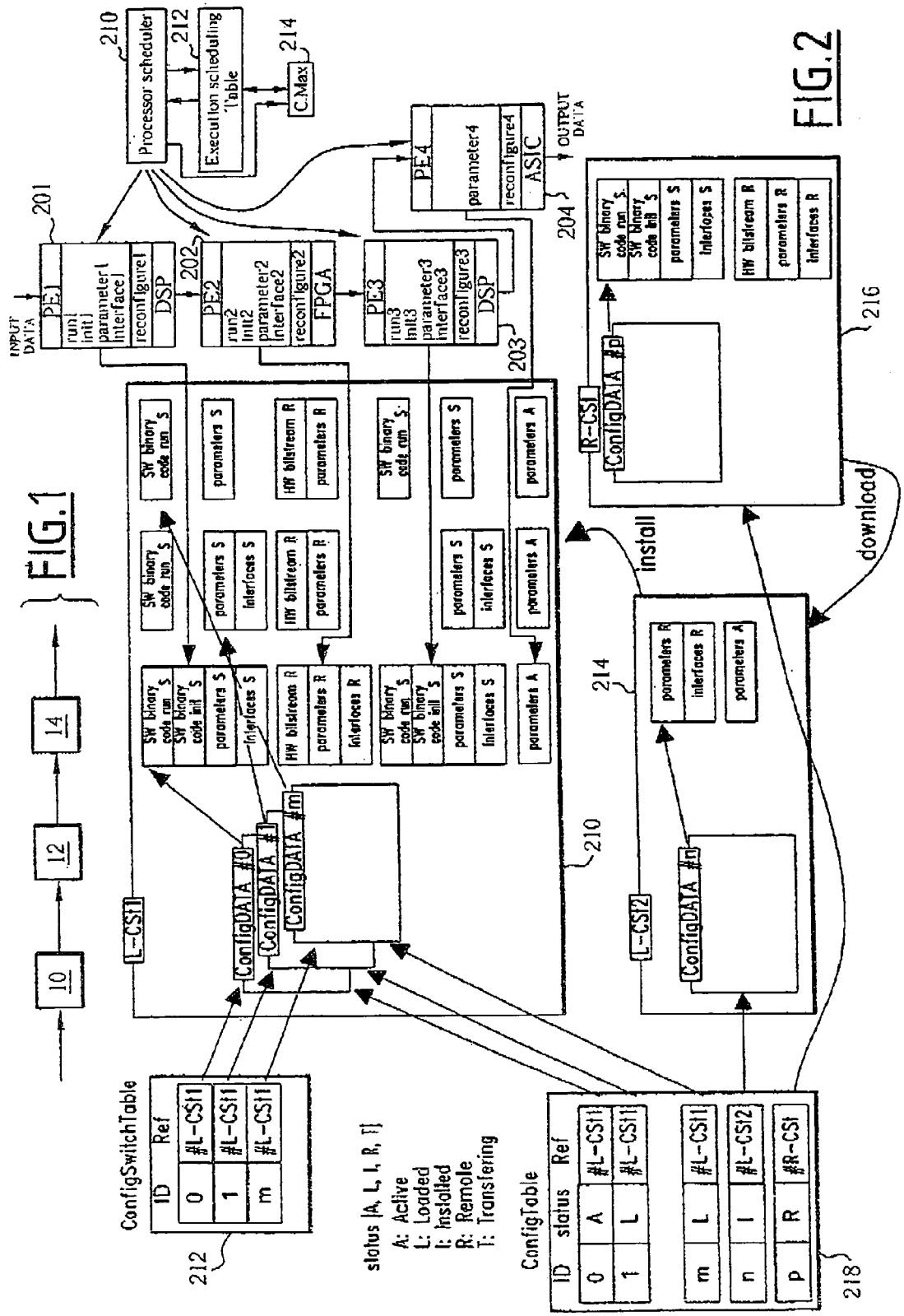

TELECOMMUNICATION DEVICE WITH SOFTWARE COMPONENTS

BACKGROUND OF THE INVENTION (1) Field of the Invention

The present invention concerns a reconfigurable telecommunication unit.

(2) Description of the Related Art

Due to technological and cost constraints, current wireless telecommunication systems are dedicated to one communication standard or way of communicating. That is why the major part of the current systems physical layer processing remains still made of dedicated pre-cabled functions (ASIC). Some programmable functions sometimes may be introduced for design convenience in order to keep a certain flexibility (often to compensate ASIC imperfections).

This implies a certain rigidity in the design and the use of the system.

A new approach is emerging: Software Radio. First reasons are design cost and time-to-market. This can be considered as a normal evolution of the current trend in the design of telecommunication systems. Higher layers than physical layer have been more and more implemented in digital and in software in the past few years. Software Radio intends at generalizing this trend to the physical layer. But because of the strong real-time embedded constraints for the physical layer, this necessitates new paradigm and methods. They are principally based on the use (as much as possible) of digital techniques since digital also means easily changeable.

SUMMARY OF THE INVENTION

The present invention targets the real-time reconfiguration of wireless mobile station or base station transceivers.

"Real-time" reconfiguration has to be understood here as the capability to reconfigure a communication system while it is communicating and without interrupting the service that is supported by the communication.

Certain circumstances may necessitate real-time reconfiguration of a wireless transceiver: performance enhancement, bug fixing, environment adaptation, automatic optimization . . . .

The problem to be solved consists in defining a Software architecture that permits to reconfigure in real-time a communication system that processes data, during the data processing itself.

The reconfigurable processing elements under interest here have the property that the means of information transportation itself is reconfigured during communication operation by the content of the information that is brought.

Accordingly, the subject-matter of the invention is as defined in claim 1.

According to particular embodiments, the invention comprises the features of one or more sub-claims.

BRIEF DESCRIPTION OF THE DRAWINGS

The invention will be better understood on reading the description which follows, given merely by way of example and while referring to the drawings in which:

FIG. 1 is a functional view of a communication device according to the invention;

FIG. 2 is a schematic view of a data structure for reconfiguration and of functional elements implemented for the configuration with a first configuration;

DETAILED DESCRIPTION OF THE PREFERRED EMBODIMENTS

Figure 3:
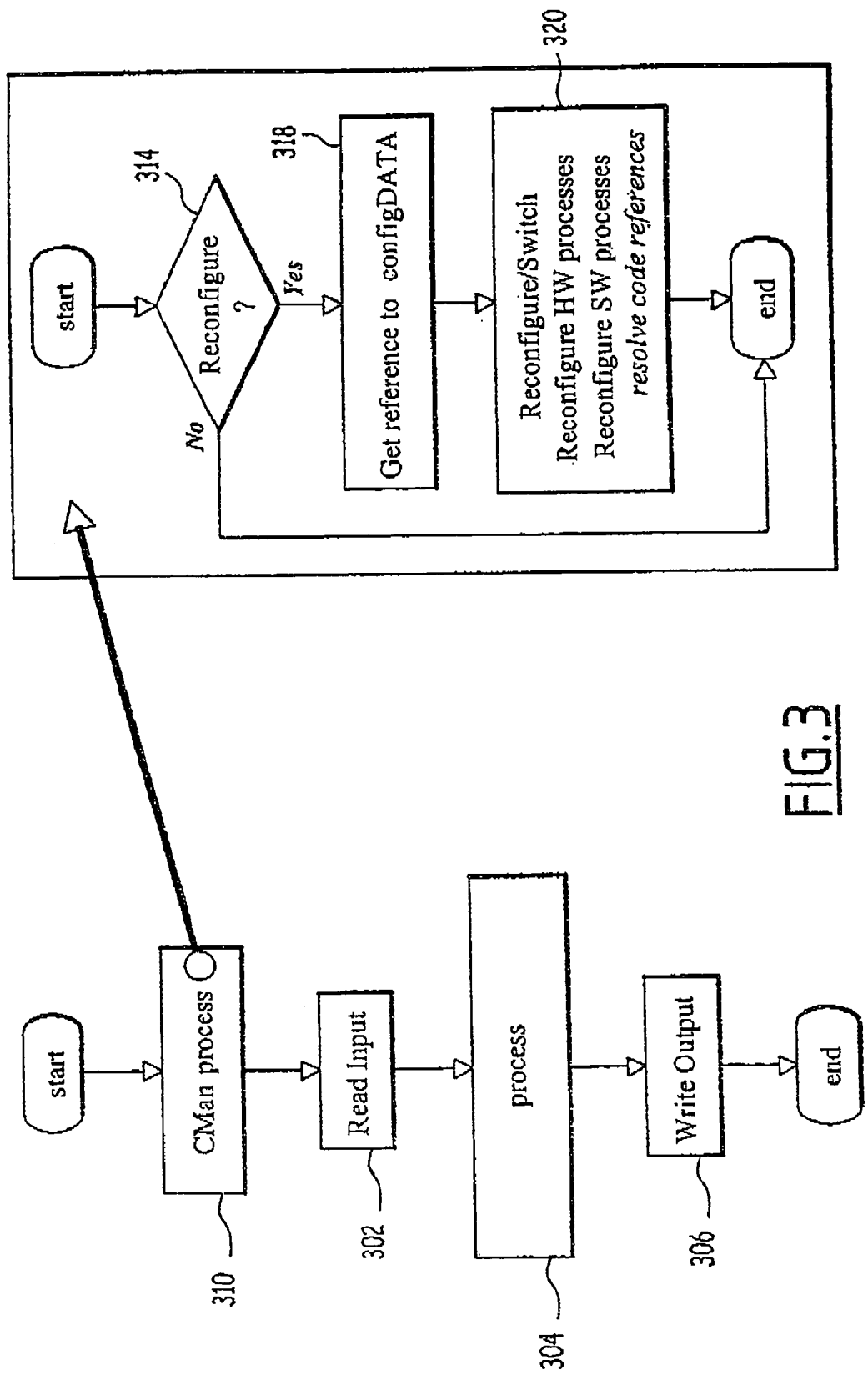
FIG. 3 is a system operation flowchart for a reconfiguration of a communication device.

A communication unit according to the invention is, for example, a wireless mobile station or a base station transceiver. It could be a transmitter or a receiver only. The invention could also be applied to a positioning system, an intelligent transportation system or a broadcast system.

As shown on FIG. 1, a communication system hardware comprises at the transmission side or the reception side or both, sometimes a part, or sometimes at least one of the following elements:

an analog input 10 comprising for example antenna(s), analog filter(s), power amplifier(s), diplexer(s), mixer(s), oscillator(s) . . . ;

an analog to digital conversion stage 12 at the reception side, or a digital to analog conversion stage at the transmission side, and processing devices 14 for example processor(s), and/or reconfigurable hardware and/or ASIC.

According to the invention, the global processing functionality of the communication system is divided in individual processing (functional) elements. At least one of them is implemented by a software component, which is reconfigurable by an own method. Such reconfigurable software component is called SDR component for Software Defined Radio component.

Each SDR components may be executed on purely dedicated hardware like an ASIC supporting no changeability;

parameterizable hardware like a digital or analog ASIC which behavior may be relatively changed by changing the parameter values;

reconfigurable hardware like a FPGA or a CPLD which supports a reconfiguration by using a bitstream;

programmable software like a processor of any kind: GPP, μC, or DSP which supports software in the form of executable code.

According to the invention, each SDR component is composed of attributes and one method.

SDR component's attributes are references to configuration data which are stored in a memory and which define the process which is implemented by the software component for processing the data. They are advantageously of the four following types:

run init parameters, and interface.

The run and init attributes are processing attributes which define the run-time process or the initialization process of the SDR component. Each run or init attribute contains a reference to the location of the code of the run-time process or the initialization process, respectively. They contain codes for processor, bitstreams for reconfigurable hardware. The reference to the location of the code is for example a pointer.

The parameters attribute contains a reference to data that can influence the software code operation, a bitstream or a pre-cabled behavior depending on the processing unit.

The interface attribute contains a reference to the connections of the SDR component in the global processing chain. The interface attribute defines the origin the data are coming from and the destination the processed data have to be outputted.

The run attribute is pointing on the run-time process and is associated with corresponding parameters to consume and produce the data to be processed through the corresponding interfaces.

The init attribute works as well on the initialization process of the processing attribute and its corresponding parameters with the same interfaces as the run attribute. It is possible to separate init from the rest of the SDR component to make an independent SDR component with different interfaces if needed.

The functional behavior of a SDR component is determined by the pointing addresses of the run and init attributes and the parameters and interfaces attributes.

A SDR component whose run and init attributes pointing addresses are not defined are called white components, as they only reserve a memory space without attributing it to any current SDR component, but for future extensions.

FIG. 2 shows an example of the software arrangement of a communication unit including SDR components.

For clarity reasons, each SDR component is assumed to be implemented on a specific processing unit.

For SDR components 201, 202, 203, 204 are linked to form a subset of processing chain. SDR components 201 and 203 are implemented on DSP, SDR components 202 and 204 are implemented respectively on a FPGA and on a ASIC.

As previously explained, each SDR component includes the run and init processing attributes, the parameter attributes and the interface attributes. On the figures, the attributes are numbered depending to the SDR component they belong to.

Each SDR component includes also its own reconfigure method.

Since SDR component is implemented on an ASIC, only the parameter attribute is indicated. Indeed, the other attributes do not exist, the corresponding features being not reconfigurable.

A set of memory locations is reserved for each SDR component to support several configurations. These memory locations are in a first level memory 210 which is called L-Cst1. The number of these locations depends on the number of configurations the system should maintain simultaneously. Each of these locations contain a new version of one, or several of the attributes processing, parameters and interface for each of the SDR components. These locations are defined at design time.

Each reserved memory location contains configuration data for a particular configuration of the communication unit. The arrangement of each memory location is defined by a configDATA table.

A configDATA is a structure that contains references to memory regions containing the actual data that permit to reconfigure one or a set of SDR components. The actual data are binary information or code for the init and run processing attributes, parameters, interface of the components. On FIG. 2, the first reconfiguration operation (ConfigDATA #0) concerns all the fields that are changeable on the three categories of devices, whereas second and third are only partial.

A ConfigSwitchTable 212 is defined for the internal bookkeeping. This table indicates, for each of these configuration, the reference to the structure containing the configuration data.

In each SDR component, each attribute is a pointer to the memory location in LCst-1 including the implementation of the run and init processing method, the parameters or the interface.

On FIG. 2, ConfigDATA #0 is assumed to be used and thus, all the attributes are pointing on the corresponding locations of ConfigDATA #0.

The storing means in the communication unit are organized as a multi-level cache. Three levels are defined.

The 1-st level (L-Cst1) corresponds to configurations stored in an execution memory, i.e. for example a processor internal memory. These configurations are pre-installed and ready for execution after some initialisation. Switching between such configurations is carried out only by diffusing parameter values to the concerned components and resolving pointer references of software component functions.

A 2-nd level (L-CSt2) corresponds to configurations stored in a secondary memory, i.e. for example the processor external memory. Switching to these configurations is carried out by first bringing the configuration data into execution memory (the 1-st level) using some data transfer mechanism (e.g. background DMA). The transferred data replaces some other 1-st level configuration or are stored in a free space. Switching then continues as previously described.

A 3-rd level (R-CSt) corresponds to configurations stored at some remote site. Such configurations can be transferred either directly to the L-CSt1 if a reconfiguration was requested or to L-CSt2 if only an update of the locally stored configurations is requested. This transfer is carried out by the establishment of a wireless communication link based on some transfer protocol that guarantees error-free data delivery.

The configurations in L-CSt1, L-CSt2 and R-CSt correspond to the system supported configurations. In order to track the configuration placement within the cache, some bookkeeping is implemented relating to the database organization. This bookkeeping can be efficiently realized by serial tables or other random access data structures indexed by the configuration identifier.

The configuration data stored in LCst-1 memory can be replaced by other configuration data coming from a second level memory denoted LCst-2 of the communication unit.

A configuration table 218 denoted ConfigTable is provided for indicating the location of configuration data.

The ConfigTable contains an entry for each supported configuration both configurations installed in execution memory and those stored in external memory. The configuration identifier (configID) is the index key to access the configuration entry and eventually the configuration data. In a simple implementation the ConfigTable is implemented as a serial table and the configID is used to index the ConfigTable.

The ConfigTable contains a status for each supported configuration. The status indicats where the configuration are stored and if they are used or not.

The possible status are:
A for Active which means that the configuration data are implemented by the SDR components;
L for Loaded which means that the configuration data are stored in L-Cst2;
I for Installed which means that the configuration data are stored in L-Cst1;
R for RemoteLoaded which means that the configuration data are stored in R-Cst2;
T for Transfert which means that they are being transferred, and consequently not available;

A processor scheduler 210 and an ExecutionSchedulingTable 212 are provided for managing the complete processing of the communication unit. The processor scheduler is adapted for triggering each processing element that can be a SDR component or not according to an infinite loop. A step of the loop for a particular SDR component will be disclosed in view of FIG. 13.

The ExecutionSchedulingTable 212 contains the list of SDR components to be executed in the order of execution. The processor scheduler covers the ExecutionSchedulingTable to compute the processing.

The ExecutionSchedulingTable is determined by the data dependancies that are associated with the application.

In order to efficiently cope with holes while suppressing a SDR component by reconfiguration, or with a shift provoked by the insertion of a new SDR component in the chain while adding a SDR component by reconfiguration, the ExecutionSchedulingTable is implemented as a link list, but other options are possible.

For managing the reconfiguration, the communication unit includes a configuration manager 214 denoted CMan.

The configuration manager (CMan) is responsible of initiating and managing the reconfiguration. The Cman decides to initiate a reconfiguration on his own or on request of another element of the network. The appropriate configuration is deployed by means of a reconfiguration process (RP) controlled by CMan. This process sets the hardware parameters, sets the software parameters and performs the needed software updates in a specified order. It also guarantees consistent system operation during and after the reconfiguration process. The CMan is capable of controlling this process by means of well defined control interfaces presented by each system component (hardware or software). The CMan is also responsible to initiate a transfer process to get the required data from the remote configuration store (R-CSt) if a configuration is not locally available in the L-CSt. In general, the reconfiguration process consists of a combination of at least one or a subset of download—install—switch phases. The exact combination depends on the availability (local or not, which can be determined by examination of the status field in the ConfigTable) of the required configurations as well as the specific deployment that may limit the system (re-)configuration capabilities.

The communication unit is working as explained below.

At run-time, the processing elements communicate through their interfaces (input, output, etc.) and the whole processing is cyclic under the driving of the processor scheduler 210. At each iteration of the infinite loop, a block of input samples is processed to produce a block of output samples. At the beginning of each iteration, the CMan process is executed.

For each iteration, the algorithm of FIG. 3 is applied to the global processing chain that contains SDR components which are active as indicated in the ExecutionSchedulingTable.

CMan process reconfigures all the SDR components present in the ConfigDATA.

Switching from a previous configuration to a next configuration can be made only if the next configuration data have been previously stored in L-Cst1.

In the following, we assume that the next configuration data are L-Cst1 and it will be disclosed later how to manage the moving of the configurations between L-Cst1, L-Cst2 R-Cst.

The cyclic process of the SDR component implemented on the processing unit is shown on the left-hand side. It represents each iteration of the communication unit infinite loop executed, each time a block of input samples is processed to produce a block of output samples. More precisely, an input sample is read at step 302 and the input sample is processed by processing unit at step 304 in order to produce a processed sample according to the run-time process currently used by the SDR component as define by the run attribute. The processed sample is outputted at step 306.

At the beginning of each iteration, the CMan process is executed at step 310. Its details are shown in the right-hand side flowchart in FIG. 3. The CMan processing is elementary. CMan determines whether a reconfiguration is necessary at step 314 according to a reconfiguration flag that had been activated for example by the user or a local manager.

In the case that no reconfiguration is required, the CMan overhead consists simply in the evaluation of the reconfiguration condition. So the transmitter/receiver operation of the processing unit is not disrupted.

If reconfiguration is required, the length of the incurred overhead delay mainly depends on how fast the interfaces to the hardware stages are. Disruption of R/T depends on the amount of slack time which is defined as the difference between the time an input block becomes available and the time processing of the previous block is completed.

The configDATA location is determined by the by the CMan in L-Cst1 at step 318.

After having found the configDATA, the reconfiguration method of the SDR components whose attributes are in the ConfigDATA are triggered on request of process of the CMan. It is implemented at step 320 to reconfigure SDR component. For the reconfiguration, the pointers of each attribute are replaced by the pointers as defined for these attributes in the new configuration data.

In addition, while the reconfiguration occurs, the ExecutionSchedulingTable is updated by the Cman in order to match with the new configuration data.

If the reconfiguration introduces no change in the data dependencies and the SDR components interconnections, the SDR components stay at the same place in the ExecutionSchedulingTable. If the reconfiguration introduces changes in the data dependencies and the SDR components interconnections, the SDR components are moved in the ExecutionSchedulingTable If necessary, new SDR components are inserted in the ExecutionSchedulingTable.

Suppressed SDR components are deleted from the ExecutionSchedulingTable. In such a case, no insertion or deletion of code is done. It is only a link that is changed at level.

Figure 4:
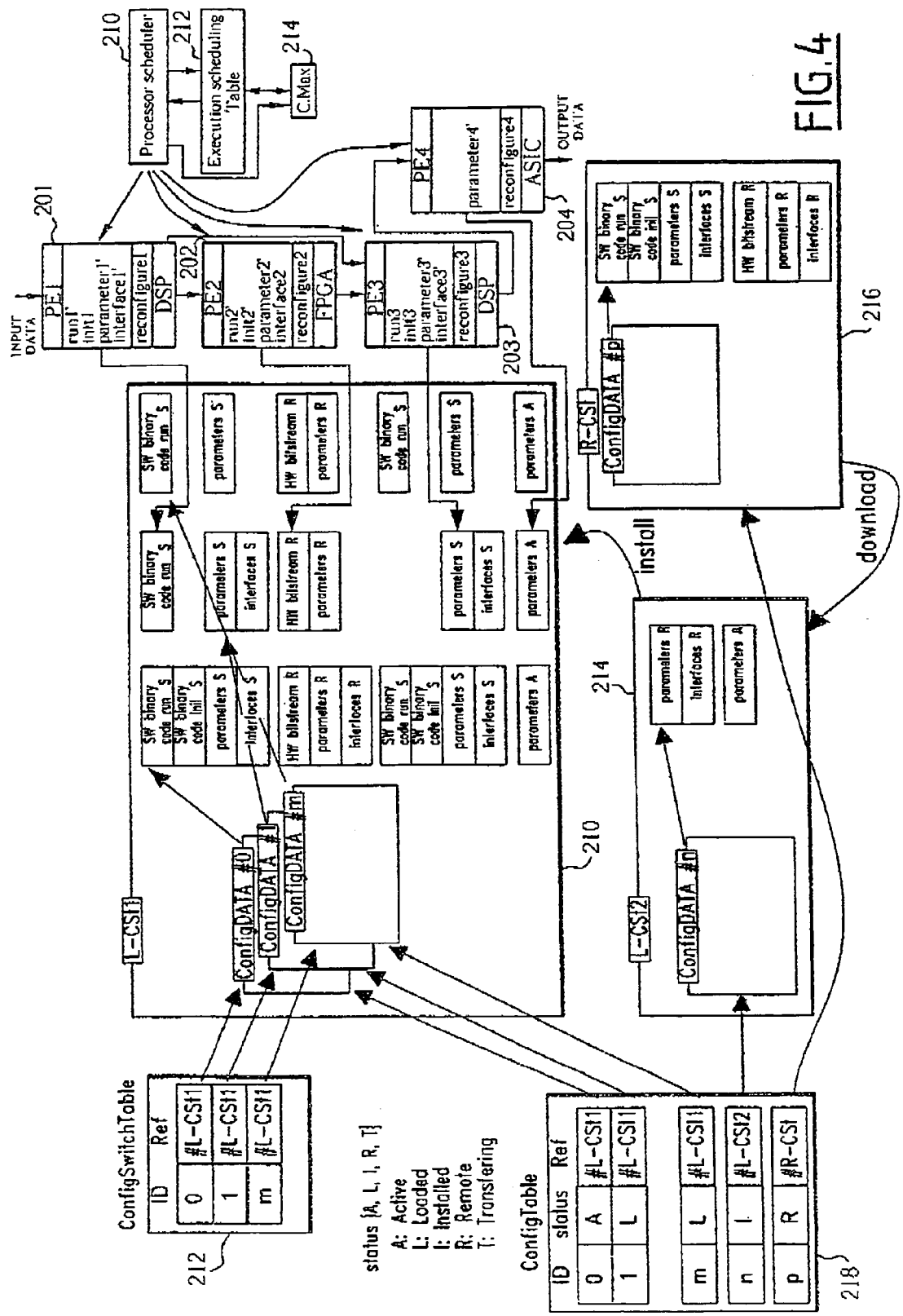
FIG. 4 is a functional view of a communication device according to the invention, with a second configuration.

An example of reconfiguration is shown on FIG. 4.

It is assumed that communication unit has been switched from ConfigDATA #0 to ConfigDATA #1. Thus, all the attributes from ConfigDATA #1 have been retained by the SDR component instead of the previous attributes if attributes are stated in ConfigDATA #1. If no attribute is present in ConfigDATA #1, the previous corresponding attributes as defined by ConfigDATA #0 are still used.

As can be shown on FIG. 4, the pointers from the SDR components are directed to the second column parameters which corresponds to ConfigDATA #1 and no more to the first column parameters.

In the considered example of FIG. 4, ConfigDATA #1 changes the use, parameter and interface attributes for SDR components 201. For SDR component 202, all the attributes except interface attribute are changed. For SDR components 203 the parameter and interface attributes are modified. Thus, a new relationship is established between SDR components 201 and 203 since data processed by SDR component 201 are directly used by SDR component 203.

Parameter attribute is changed for SDR component 204. Since the SDR component 204 is an ASIC, only this attribute can be modified.

The invention claimed is:

1. A telecommunication system comprising:
   a processing unit;
   a memory
   at least one software component implemented on a processing unit and configured to use said memory, the at least one software component including,
      a set of attributes, each attribute includes a pointer to a particular location of a memory in which configuration data are stored, the configuration data defining features of the at least one software component, and also defining at least one run attribute that defines a run-time process configured to process the data in the at least one software component
      program code for reconfiguration configured to switch the linkage of an attribute from an initial location in said memory to a final location in said memory;
   means for triggering on request the program code for reconfiguration executed on the processing unit for the at least one software component;
   means for activating the run-time process defined by the run attribute of the at least one software component according to a predetermined schedule.

2. The telecommunication system according to claim 1, wherein
   the at least one software component includes an init attribute configured to prepare the at least one software component to the run-time process defined by the run attribute.

3. The telecommunication system according to claim 1, wherein
   the set of attributes includes a processing attribute defining an algorithm made of a set of successive steps to be implemented by the processing unit for processing the data.

4. The telecommunication system according to claim 1, wherein
   the set of attributes includes a parameter attribute defining at least a particular feature of the process implemented by the processing unit for processing the data.

5. The telecommunication system according to claim 1, wherein
   the set of attributes includes an interface attribute defining the origin the data to be processed are coming from and to define the destination the processed data have to be outputted.

6. The telecommunication system according to claim 1, further comprising:
   means for modifying the predetermined schedule.

7. The telecommunication system according to claim 1, wherein
   said memory includes a memory location reserved for the at least one software component, said attributes of the at least one software component being stored in said reserved memory location.

8. The telecommunication system according to claim 1, further comprising:
   means for storing in said memory at least two sets of configuration data for the at least one software component, the run attribute being linked to only one set of configuration data for the at least one software component.

9. The telecommunication system according to claim 8 wherein
   the at least two sets of configuration data stored in the memory are located in a specific memory implantation defined at design time.

10. The telecommunication system according to claim 1, further comprising:
    a table including all the processing elements of the system including the at least one software component used for processing the data, wherein
    said means for activating the run-time process defined by the run attribute of the at least one software component according to a predetermined schedule are configured to activate the run-time process defined by the run attribute of the at least one software component which are in the table.

11. The telecommunication system according to claim 1, further comprising:
    a chain of software components, wherein
    the means for triggering the reconfiguration for the at least one software components and means for activating the run-time process of the at least one software components are applied on the same chain of software components for a real-time reconfiguration while the system is communicating.

* * * * *